United States Patent
Devitt et al.

(10) Patent No.: US 7,351,977 B2
(45) Date of Patent: Apr. 1, 2008

(54) METHODS AND SYSTEMS FOR DISTINGUISHING MULTIPLE WAVELENGTHS OF RADIATION AND INCREASING DETECTED SIGNALS IN A DETECTION SYSTEM USING MICRO-OPTIC STRUCTURES

(75) Inventors: John W. Devitt, Maineville, OH (US); Mark E. Greiner, Mason, OH (US); Jeffrey J. Voelker, Butler, PA (US); David R. Wade, Cincinnati, OH (US); Michael J. Garter, Liberty Township, OH (US)

(73) Assignee: L-3 Communications Cincinnati Electronics Corporation, Mason, OH (US)

( * ) Notice: Subject to any disclaimer, the term of this patent is extended or adjusted under 35 U.S.C. 154(b) by 117 days.

(21) Appl. No.: 10/702,702

(22) Filed: Nov. 6, 2003

(65) Prior Publication Data

US 2004/0104346 A1 Jun. 3, 2004

Related U.S. Application Data

(60) Provisional application No. 60/424,863, filed on Nov. 8, 2002.

(51) Int. Cl.
*G01J 5/02* (2006.01)
(52) U.S. Cl. .................................................. 250/353
(58) Field of Classification Search .......... 250/339.14, 250/339.11, 339.13, 341.8, 584, 154, 353
See application file for complete search history.

(56) References Cited

U.S. PATENT DOCUMENTS

| 2,769,111 A | 6/1956 | Sadowsky |
| 2,897,399 A | 7/1959 | Garwin et al. |
| 3,020,406 A | 2/1962 | Whitney |
| 3,110,816 A * | 11/1963 | Kaisler et al. ......... 250/227.11 |
| 3,341,826 A | 9/1967 | Lee |
| 3,593,029 A | 7/1971 | Sakaguchi et al. |
| 3,714,430 A | 1/1973 | Finvold et al. |

(Continued)

OTHER PUBLICATIONS

Website printout, Understanding and Utilizing Focal Plane Arrays (FPA), http://x26.com/infrared/images/fpa.htm, printed Oct. 14, 2002.

(Continued)

*Primary Examiner*—Constantine Hannaher
(74) *Attorney, Agent, or Firm*—Dinsmore & Shohl LLP

(57) ABSTRACT

Methods and systems for detection of. One method includes receiving light of a predetermined wavelength range from a source, and splitting the received light into multiple components having differing wavelengths. The method further includes directing the components toward individual locations spaced from one another. In addition, this illustrative method includes detecting at least some of the components at the locations. One illustrative system includes a plurality of detectors provided along an image facing plane of an array, wherein each detector has a width less than or equal to that of its conesponding pixel location, wherein at least two detectors are located within a single pixel location, wherein the size of each pixel location is approximately equal to the blur spot or smallest visible spot for the focal plane array, and a plurality of light pipe regions, wherein at least two light pipe regions are located within a single pixel location.

5 Claims, 6 Drawing Sheets

U.S. PATENT DOCUMENTS

| | | | |
|---|---|---|---|
| 3,973,118 | A | 8/1976 | LaMontagne |
| 4,559,695 | A | 12/1985 | Baker |
| 4,628,206 | A | 12/1986 | Astheimer |
| 4,687,329 | A | 8/1987 | Schultz |
| 4,822,998 | A | 4/1989 | Yokota et al. |
| 5,041,723 | A | 8/1991 | Ishida et al. |
| 5,166,755 | A | 11/1992 | Gat |
| 5,210,400 | A | 5/1993 | Usami |
| 5,227,656 | A | 7/1993 | Timlin et al. |
| 5,239,179 | A * | 8/1993 | Baker ...................... 250/338.4 |
| 5,260,826 | A | 11/1993 | Wu |
| 5,304,500 | A | 4/1994 | Timlin et al. |
| 5,351,151 | A | 9/1994 | Levy |
| 5,360,973 | A | 11/1994 | Webb |
| 5,497,269 | A | 3/1996 | Gal |
| 5,550,373 | A | 8/1996 | Cole et al. |
| 5,600,486 | A | 2/1997 | Gal et al. |
| 5,777,329 | A | 7/1998 | Westphal et al. |
| 5,877,500 | A * | 3/1999 | Braig et al. ................. 250/353 |
| 5,953,155 | A | 9/1999 | Eckel, Jr. et al. |
| 5,960,097 | A | 9/1999 | Pfeiffer et al. |
| 6,157,017 | A | 12/2000 | Kim |
| 6,222,454 | B1 * | 4/2001 | Harling et al. .............. 340/584 |
| 6,301,004 | B1 | 10/2001 | Jung et al. |
| 6,444,984 | B1 | 9/2002 | Lundgren et al. |
| 6,449,023 | B2 | 9/2002 | Swanson et al. |
| 6,646,799 | B1 * | 11/2003 | Korniski et al. ............. 359/407 |
| 6,903,343 | B2 * | 6/2005 | Amon et al. ................. 250/353 |
| 2003/0218801 | A1 * | 11/2003 | Korniski et al. ............. 359/407 |
| 2005/0163365 | A1 * | 7/2005 | Barbour ...................... 382/154 |

OTHER PUBLICATIONS

Del Bianco, Alessandro, Gabriella Serafino and Gunter Spock, "An Introduction to Spectral Imaging," Carinthian Tech Research GmbH, Europastraβe 4 A-9524, Village St. Magdalen, Austria.

Ge, Jian, D. Ciarlo, P. Kuzmenko, C. Alcock, B. Macintosh, R. Angel, N. Woolf, M. Lloyd-Hart, R. Q. Fugate and J. Najita, "Adaptive Optics High Resolution Spectroscopy: Present Status and Future Direction."

Wong, W., C. shih, K. Broderick, S, Desai, D. Freeman, G. Nielson and A. Sinha, "Analog Tunable Gratings—A Piezoelectric Implementation with Nanometer Deformatin."

Website printout, CMC Electronics Cincinnati, *TVS-8500*, http://www.cmccinci.com/irdata.htm, printed Nov. 6, 2003.

Website printout, CMC Electronics Cincinnati, *NightFalcon II*, http://www.cmccinci.com/irdata.htm, printed Nov. 6, 2003.

Website printout, CMC Electronics Cincinnati, *NightMaster*, http://www.cmccinci.com/irdata.htm, printed Nov. 6, 2003.

Website Printout, CMC Electronics Cincinnati, *Delco Target Acquisition System*, http://www.cmccinci.com/irdata.htm, printed Nov. 6, 2003.

Website printout, CMC Electronics Cincinnati, *CE011A InSb 1024×1024*, http://www.cmccinci.com/irdata.htm, printed Nov. 6, 2003.

Website printout, CMC Electronics Cincinnati, *NightConqueror 640*, http://www.cmccinci.com/irdata.htm, printed Nov. 6, 2003.

Website printout, CMC Electronics Cincinnati, *NightConqueror 256*, http://www.cmccinci.com/irdata.htm, printed Nov. 6, 2003.

Website printout, CMC Electronics Cincinnati, *NightMaster SeeSpot*, http://www.cmccinci.com/irdata.htm, printed Nov. 6, 2003.

Website printout, CMC Electronics Cincinnati, *CE961 InSb 256×256*, http://www.cmccinci.com/irdata.htm, printed Nov. 6, 2003.

Website printout, CMC Electronics Cincinnati, *Cryogenic Coolers*, http://www.cmccinci.com/irdata.htm, printed Nov. 6, 2003.

Website printout, CMC Electronics Cincinnati, *Infrared Surveillance System*, http://www.cmccinci.com/IRSurvSys.htm, printed Nov. 6, 2003.

Website printout, CMC Electronics Cincinnati, *AN/AAR-44A*, http://www.cmccinci.com/44a.htm, printed Nov. 6, 2003.

* cited by examiner

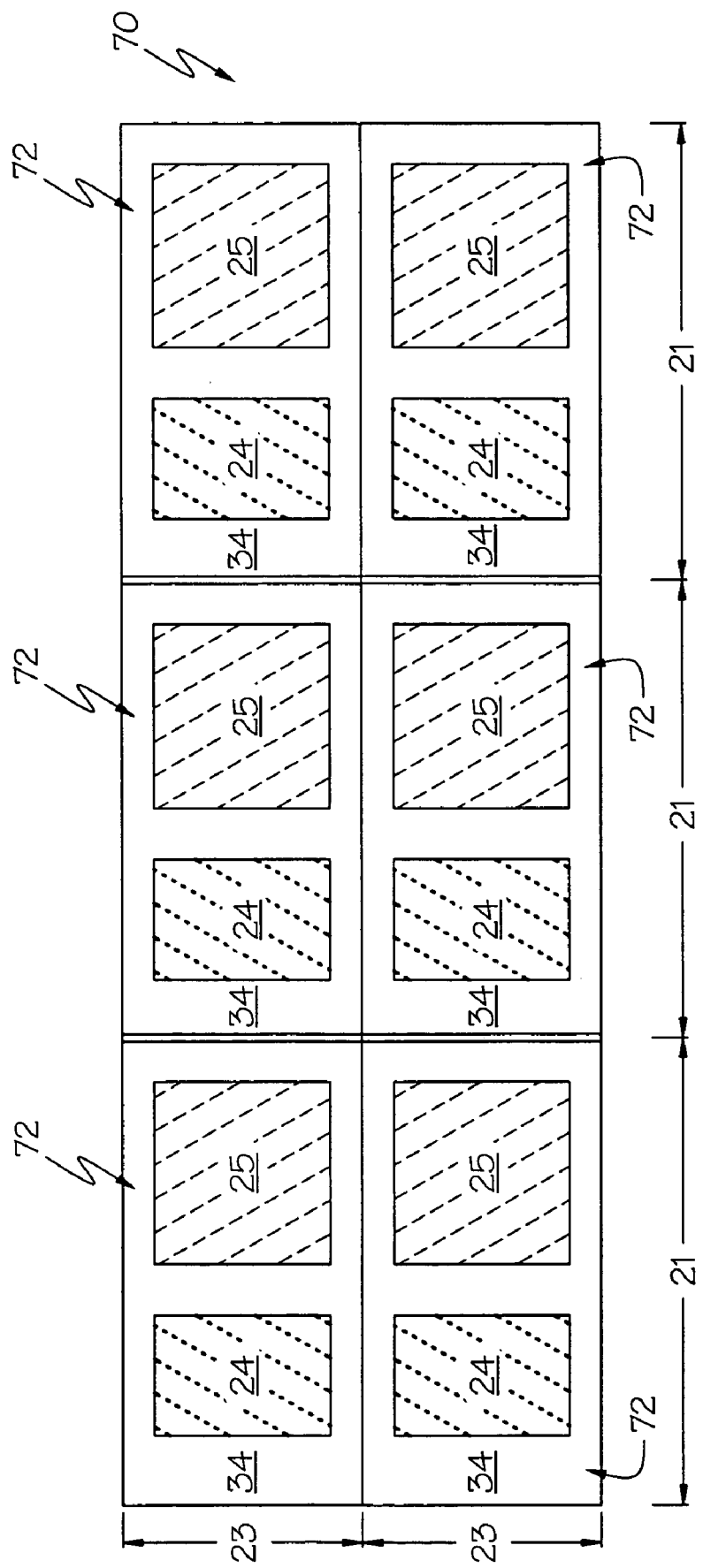

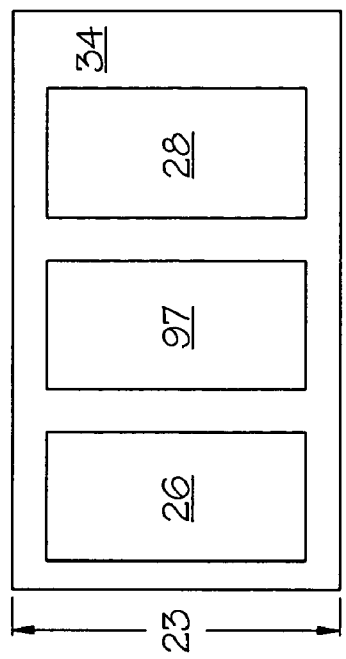
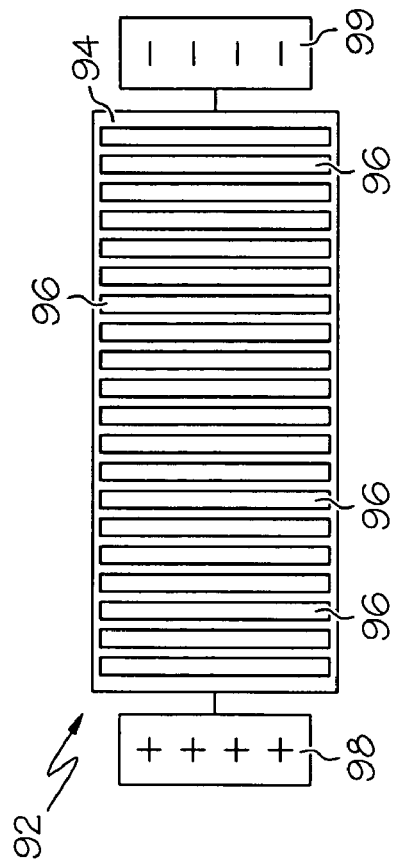
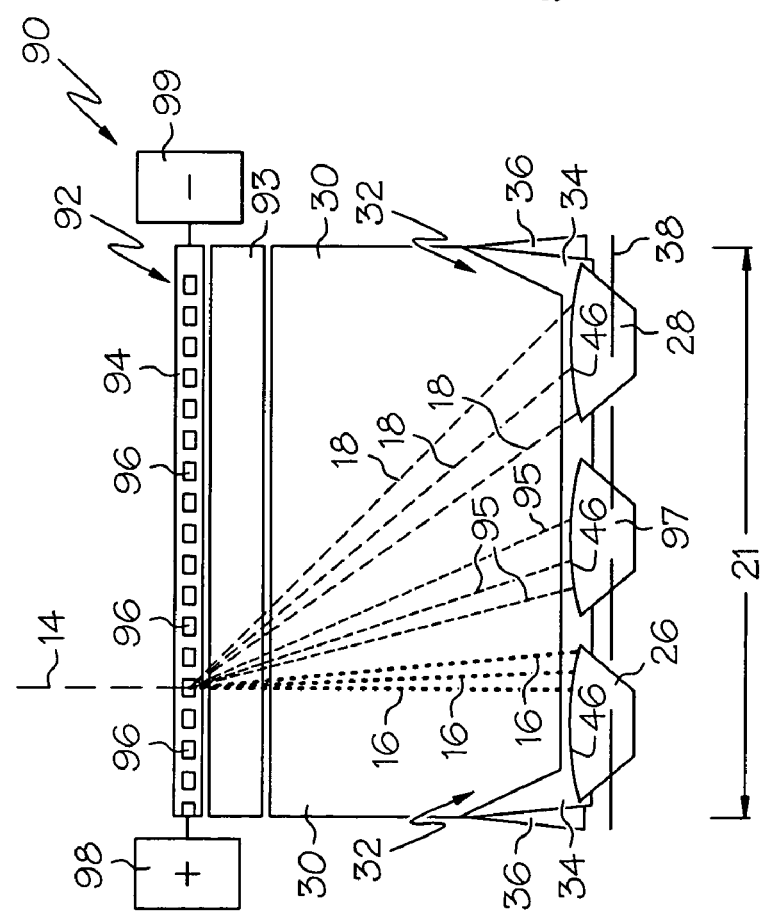

METHODS AND SYSTEMS FOR DISTINGUISHING MULTIPLE WAVELENGTHS OF RADIATION AND INCREASING DETECTED SIGNALS IN A DETECTION SYSTEM USING MICRO-OPTIC STRUCTURES

This application claims the benefit of U.S. Provisional Application Ser. No. 60/424,863 filed on Nov. 8, 2002, the entire disclosure of which is hereby incorporated herein by reference.

TECHNICAL FIELD

The present invention relates generally to detection systems and in particular to methods and systems for distinguishing multiple wavelengths in an imaging system so that components of the received radiation having first and second wavelength ranges can be identified.

BACKGROUND OF THE INVENTION

A variety of optical detection systems have been developed which are sensitive to radiation of various wavelength ranges. For example, digital cameras are commercially available to consumers and are configured to detect and record reflections and emissions of light having a wavelength in the visible spectrum range, thereby effectively capturing and recording scenes (as a human observer might sense them). As another example, infrared imaging systems are provided to detect radiation in the infrared wavelength range that is emitted from or reflected by objects within a scene. Such infrared imaging systems can view objects within scenes that would normally not be apparent to an optical detection system capable only of detecting light in the visible spectrum. These infrared imaging systems are particularly useful for real-time viewing of scenes at night or through smoke, and are frequently utilized in military equipment for detecting missiles, aircraft, vehicles, vessels, and the like.

Such systems typically utilize a focal plane array for detection of radiation. A focal plane array comprises an array of pixel locations, wherein each pixel location includes one or more minute detectors configured to detect a portion of the radiation emitted from the scene. The array is coupled to an integrated circuit, and the resulting image is formed by the combination of the portions detected at the various pixel locations. In other words, the simultaneous signals from the various detectors at the pixel locations of the array provide a representation of the scene in real-time.

When a single pixel of a focal plane array includes a plurality of detectors, each of the included detectors can be configured to detect a different color of light. For example, in a focal plane array configured to detect visible light, each pixel might include four detectors, wherein one detector is configured to detect red light, one detector is configured to detect blue light, and two detectors are configured to detect green light. Similarly, a focal plane array configured to detect infrared light might include two detectors, wherein a first detector can detect infrared light within a first wavelength range (e.g., between 3.5 µm and 4.0 µm) and the second detector can detect infrared light within a second wavelength range (e.g., between 4.3 µm and 4.8 µm. A focal plane array having either such configuration can therefore differentiate the incoming light and can consequently identify the wavelength(s) of the incoming light. In both visible and infrared imaging systems, such discrimination of wavelength ranges or "colors" is desirable because it provides additional information about the source of the radiation and can assist in identifying the objects being viewed.

To implement such a color-sensitive focal plane array, a "stacked," three-dimensional detector configuration could be implemented wi specifically, multiple detectors can be placed vertically on top of one another such that the top detector can detect the portion of light within a first wavelength range but can allow light outside of the first wavelength range to pass through to lower sensors configured to detect such light. In this manner, multi-band radiation can be detected and discriminated. However, some such "stacked" architectures can require etching of complex vias in the device, and can also require complex procedures for aligning the detectors and readout circuitry. Such high complexity can result in high production costs and lowered operability and reliability.

In other implementations, flat architectures could be utilized where detectors are not stacked but rather are placed side-by-side horizontally within a two-dimensional array. However, such multi-color, two-dimensional architectures typically require the use of a filter for each detector, each filter rejecting any radiation which is out of the wavelength band for the given detector. Accordingly, a substantial amount of energy can be lost, because radiation out of the band for the filter is discarded and not recovered, even though that radiation may be in the bandpass range for another adjacent filter which corresponds to a detector for a different wavelength range. Consequently, some such systems can suffer from a low fill factor (fraction of area of the detector which is photo-electrically active) and low efficiency, due to the loss of potentially detectable radiation within the broader wavelength range of interest.

Accordingly, improved methods and systems are desired which allow for the detection of multiple wavelength ranges or "colors" of radiation from a scene, to allow for real-time viewing of a representation of the scene.

SUMMARY OF THE INVENTION

The present invention relates to methods and systems for detection of multiple wavelengths of radiation in an optical imaging system.

According to one embodiment, an infrared imaging system is provided for providing images of a scene. The system of this embodiment comprises a focal plane array having a detection layer with a plurality of pixel locations, as well as a dispersive optic positioned near the central portion of each pixel. At each pixel location, a first and a second detector are provided and are located adjacent to each other along the detection layer, the detectors being configured to detect the presence of infrared light. The dispersive optic is configured to receive infrared light from a scene and to separate the light into a spectrum having a first wavelength range and a second wavelength range. The optic is further configured to transmit the light in the first wavelength range toward the first detector and the light in the second wavelength range toward the second detector. The dispersive optic may comprise a prism, a diffraction grating, a piezoelectric grating, or other suitable optical element for separation of light into multiple wavelength ranges. The detectors can comprise photodiodes or other sensors capable of detecting the wavelength of interest.

According to another embodiment, a focal plane array is provided for providing simultaneous real-time images of scenes. The focal plane array of this embodiment comprises a plurality of first detectors provided along a two-dimensional image facing plane and a plurality of second detectors provided along the image facing plane. Each first detector is provided at a pixel location and is configured and positioned to detect the presence of light within a first region of the infrared wavelength band, while each second detector is provided at the pixel location adjacent to a corresponding first detector for that pixel location. Each second detector is configured and positioned to detect the presence of light within a second region of the infrared wavelength band.

In another embodiment, a system is provided for providing real-time images of scenes. The system comprises a plurality of detection locations arranged into a two-dimensional array and an optical element associated with each detection location. Each detection location includes a plurality of detectors positioned adjacent to each other. The optical element is configured to receive light, separate the light into multiple wavelength ranges, and direct light in a first wavelength range toward a first detector of the detection location and light in a second wavelength range toward a second detector of the detection location. The wavelength ranges may fall in the infrared wavelength band for example, and the detectors may comprise diodes positioned along the two-dimensional array or in other suitable configurations. The optical element may comprise a prism, grating, piezoelectric grating material, or other suitable optical (non-lens) element that does not necessarily converge or diverge the radiation.

In accordance with another embodiment of the invention, a method is provided for generating real-time image representations of scenes. The method comprises receiving light in a predetermined wavelength range from a source, and splitting the received light into multiple individual components having differing wavelengths. The method further comprises directing the components toward individual locations spaced from one another. In addition, this embodiment comprises transmitting the components using at least one light pipe toward the locations, and detecting at least some of the components at the locations. The predetermined wavelength range can comprise at least a portion of the infrared range and/or the visible range, for example. In another embodiment, the method may further comprise indicating the detection of the components on a display using multiple colors. The splitting and directing operations may be conducted simultaneously or at discrete times. The operations of this method may be conducted by components at each pixel location in a detection system, and if multiple pixels are provided in the system, the components for the various pixels could conduct the operations simultaneously and repetitively so as to provide multi-wavelength real-time images of a scene being viewed.

According to another embodiment, a method for constructing a real-time imaging system is provided. The method comprises determining a pixel size for the system based upon components to be used in the system, and providing a plurality of sensors within the pixel size. The sensors are spaced horizontally and/or vertically from one another within an image facing plane. Moreover, the sensors are configured to detect radiation in different wavelength bands, such as by using wavelength specific sensors and/or bandpass filters. The method further comprises providing an optic to receive radiation from a scene. The optic is configured to receive and spatially separate the radiation from the scene and to transmit the separated components of the radiation toward spatially separated sensors.

Still other advantages, aspects, and embodiments will become apparent to those skilled in this art from the following description wherein there is shown and described particular embodiments of this invention simply for the purposes of illustration. As will be realized, other aspects and embodiments may be provided without departing from the scope of the invention. Accordingly, the advantages, drawings, and descriptions provided herein are to be considered illustrative in nature and not restrictive in nature.

BRIEF DESCRIPTION OF THE DRAWINGS

It is believed that the present invention will be better understood from the following description of illustrative embodiments taken in conjunction with the accompanying drawings, wherein like reference numerals indicate corresponding structures throughout the views and in which:

FIG. 6 is a top cross-sectional view taken along the detection layer of the optical detection system embodiment of FIG. 5;

FIG. 7 is a side cross-sectional view of another illustrative optical detection system made and operating according to principles of the present invention, the dispersive optic comprising a piezoelectric grating;

FIG. 8 is a top cross-sectional view taken along the detection layer of the illustrative optical detection system of FIG. 7; and FIG. 9 is a top view of the piezoelectric grating of the embodiment of FIG. 7.

DETAILED DESCRIPTION OF ILLUSTRATIVE EMBODIMENTS

In general, one illustrative embodiment of the invention relates to an optical imaging system having multiple detectors for each pixel which simultaneously generate multi-wavelength real-time representations of scenes. In this embodiment, a dispersive optic(such as a prism or a grating or another non-lens type of optic for example) is associated with each pixel and separates radiation between multiple wavelength components directing a component toward each detector. The dispersive optic can be placed near the center of each pixel to minimize the dispersion of radiation to locations outside of the pixel. The detectors may comprise photodiodes or other suitable sensors, and may be configured in an appropriate arrangement within the pixel. For example, the detectors may be placed adjacent to one another in an image facing plane of the array. In this example, other elements such as filters, light pipes, silicon channels, and/or reflective walls or mirrors may be utilized if desired for more effective transmission and detection by the detectors. Likewise, various types and arrangements of elements may be utilized with this illustrative embodiment.

For example, the detectors may comprise different types or sizes based upon the type of radiation to be detected and/or the use contemplated, and/or filters may be utilized, for more efficient capture of the wavelengths of interest. Because this embodiment can direct separate wavelength ranges (e.g., bands) to separate and spaced detectors within a given pixel, increased fill factor and efficiency can result.

Figure 1:
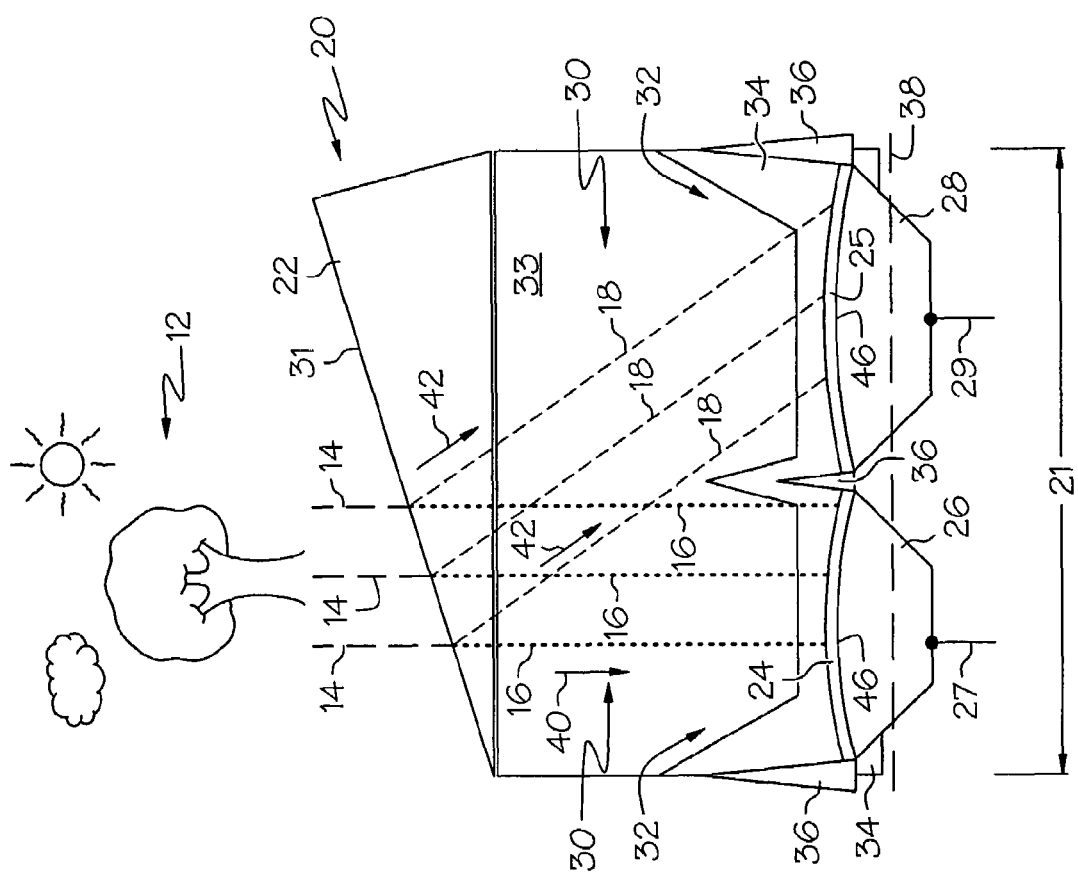
FIG. 1 is a side cross-sectional view of an optical detection system made and operating according to principles of the present invention.

FIG. 1 is a side cross-sectional view of one example of an optical detection system 20 made and operating in accordance with principles of the present invention. The system 20 receives radiation 14 from a scene 12 in order for the user to view a representation of the scene 12. The scene 12 may include objects such as aircraft, missiles, vehicles, buildings, and/or landscape, and the radiation 14 may be electromagnetic radiation which is emitted from and/or reflected from the scene. For example, the radiation 14 may comprise infrared radiation or near-infrared radiation, in night detection or thermal imaging applications, or radiation 14 may comprise visible light, for application to other optical systems. As can be therefore be understood, the system 20 provides continuous real-time representations of the scene 12.

In this example, the optical system 20 includes a pair of detectors 26 and 28 as well as a dispersive optic, in the form of a prism 22 in this example, disposed between the scene 12 and the detectors 26 and 28. In particular, the prism 22 includes an image-facing side 31 which faces the scene 12 for receiving radiation therefrom, as well as a sensor facing side 33 which faces toward the detectors 26 and 28. The radiation 14 from the scene 12 is received at the imaging-facing side 31, transmitted through the prism 22 to the sensor-facing side 33, and then onward to detectors 26 and 28.

Figure 2:
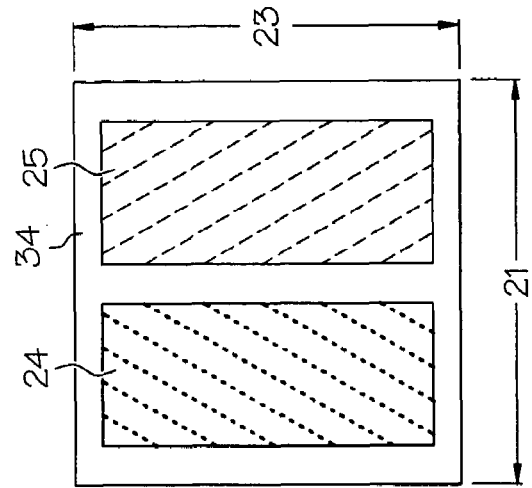
FIG. 2 is a top cross-sectional view taken along the detection layer of the illustrative optical detection system of FIG. 1.

The detectors 26 and 28 in this illustrative embodiment are sized and positioned so as to fit within a single pixel area. The pixel size for a given optical system may vary based upon the optical components within the system, such as lenses and the like, as well as the blur spot size provided by these components. In particular, the blur spot size is determined by the "eff number" or f/# and corresponds with the smallest visible spot provided by the system. Accordingly, the pixel size for a given system is typically dictated by the f/# number for the system. As shown in FIG. 1 and FIG. 2, the pixel size for this example has a width 21 and a length 23 and both detectors 26 and 28 fit within this area.

In this example the detectors 26 and 28 are provided adjacent to one another in an image-facing plane 38 which generally faces the scene 12 and is approximately parallel with the sensor-facing side 33 of the prism 22, rather than the detectors being stacked in a vertical configuration with respect to each other. The detectors 26 and 28 may comprise any of a variety of sensors suitable to sense radiation 14. As an example, the detectors 26 and 28 may comprise semiconductor electro-optical detectors of the photovoltaic or photoresistive type. For example, each detector 26 and 28 may comprise a photodiode comprising a region of one conductivity type adjacent to (e.g., at a junction) a semiconductor region of a second conductivity type. As discussed above, the detectors 26 and 28 may sense infrared radiation, such as infrared energy in the 1.0-5.6 micron wavelength band for example. Photovoltaic electro-optical detectors for the infrared wavelength are frequently made of silicon, indium antimonide (InSb), or cadmium mercury telluride, and include a p-n junction for detecting charge carriers generated in the material by the infrared radiation.

Such detectors 26 and 28 can be manufactured using any of a variety of suitable methods and architectures. For example, the methods for manufacturing reticulated pixels having low-crosstalk described in U.S. Pat. Nos. 5,304,500 and 5,227,656 may be utilized, where an array of p-n junctions are formed on a bulk semiconductor substrate of a first conductivity type close to a surface of the substrate (each junction being located between the first conductivity type and semiconductor regions of a second conductivity type), a portion of the semiconductor regions is metalized, the semiconductor regions of the second conductivity type are bonded to an optically transparent support backing, and the thickness of the substrate is reduced so there is formed an array of semiconductor diodes. The entire disclosures of U.S. Pat. Nos. 5,304,500 and 5,227,656 are hereby incorporated herein by reference. Accordingly, the detectors 26 and 28 may comprise semiconductor diodes having an electrical property effected by optical energy incident thereon and can include a junction separating first and second differently doped regions, although other types and configurations of radiation detectors and sensors may be utilized. The sensors in such an array thereby operate simultaneously to produce real-time representations of the scene being viewed.

Other components and materials may be utilized in the system 20 in order to provide the radiation from the prism 22 to the detectors 26 and 28. In this example, a substrate 30 is provided between the detectors 26 and 28 and the prism 22 and includes channeled light pipe regions 32 to assist in delivery of the radiation to the detectors 26 and 28. The substrate 30 may comprise a material such as silicon, for example. The light pipe regions 32 of the substrate 30 can comprise any of a variety of channels, passageways, waveguides, light guides or other optical pathways configured within the substrate 30 for assisting in the direction of the radiation toward the detectors 26 and 28.

In addition, in this example, sidewall regions 36 are formed or connected with the system 20 and can assist in keeping any reflected radiation contained within the system 20 and directed toward the detectors 26 and 28. For instance, the sidewalls may comprise a peaked metallic material disposed at the edges of the system 20 and between the detectors 26 and 28, and having a higher index of refraction than the surrounding materials and components.

In addition, each detector 26 and 28 can include a filter 24 and 25 in the system 20 for ensuring that any extraneous radiation outside of the wavelength range for a given detector is not passed to that detector. In this example, the filters 24 and 25 are attached or formed on the detection layer 46 provided by the detectors 26 and 28 for receiving the radiation to be detected. The filter material 24 and 25 may comprise materials or components tuned to pass only the wavelength range intended for detection by the associated detector. For instance, dielectric stack filters may be utilized.

As best shown in FIG. 2, the filters 24 and 25 and underlying sensors 26 and 28 of this example are approximately of the same size and, when placed adjacent to each other, collectively fit within a pixel area defined by dimensions 21 and 23. However, as will be discussed below, other sizes, arrangements, and configurations are possible.

The image-facing side 31 of the prism 22 is formed such that it has a non-zero, pre-determined slope so as to provide appropriate dispersion of the radiation 14. The prism 22 may be formed with or connected to the other components of the system 20. For example, prism 22 might be integral with one or more light pipe regions 32. The prism 22 may be formed by various suitable methods such as those which utilize silicon immersion, photoresist deposition, electrodeposition, lithography, and/or ultrasonic agitation.

To secure various components of the system 20, an adhesive or glue material 34 may be utilized. As will be discussed in further detail below, the components of the system 20 may be duplicated multiple times to form an array of detection systems within a plurality of detection locations. Performance can be tuned by varying the relative area of the two detectors, the chromic separation of the prism, and the height of the sidewalls, among other parameters. The signals from each detector 26 and 28 may be provided to appropriate electronics or circuitry such as by using conductor lines 27 and 29 or other appropriate contact pads, leads, conductive material, conductor patterns, or circuitry.

In addition or as alternatives to the elements shown, other elements such as protective housings, converging or diverging lenses, re-imaging lenses, filters, limiters, gratings, microlens arrays, cold filters, protective plates, imaging processing circuitry and the like can be provided to assist in the detection of radiation or display thereof. The specific elements utilized will depend on the type and/or environment of the use contemplated. For example, for applications requiring higher sensitivity to infrared radiation, a cooling system, such as a cryogenic cooling system for example, can be provided to cool the detectors and other components.

In operation, radiation 14 from the scene 12 is received at the image-facing side 31 of the prism 22 which separates the radiation 14 into multiple components 16 and 18. More specifically, the dispersive property of the prism 22 causes the separation of the radiation 14 into short wavelength radiation components 18 and long wavelength radiation components 16. For example, if the radiation 14 was in the infrared region, the short wavelength radiation components 18 may comprise radiation having a wavelength of between about 3 microns to about 4 microns while the longer wavelength components 16 may comprise radiation having a wavelength between about 4 microns to about 5 microns. If the radiation 14 comprises visible light, the short wavelength radiation 18 may comprise light in the blue range while the longer wavelength radiation 16 may comprise light in the red range. As can be understood, although components 16 and 18 are shown as lines, such lines shown in the drawings can represent a single wavelength, a wavelength range, or a plurality of individual wavelengths of radiation spaced from one another (e.g., a spectrum).

Because light bends or refracts when it travels from one medium to another, the prism 22 can cause a separation of the light 14 when it encounters the image facing surface 31 of the prism 22 at a particular angle. More specifically, because light travels faster through air than it does through the prism 22, the light 14 can refract due to the shape of the prism 22, its refractive properties, and the angle of the light 14, causing the light 14 to be separated into signals of individual wavelengths or wavelengths ranges. In particular, due to this separating effect caused by the prism 22, the first components 16 are directed in a first direction 40 while the second components 18 are directed in a second direction 42. Thus, the components 16 are directed toward the first detector 26 while the components 18 are directed toward the second detector 28. Accordingly, by spatially separating components 16 and 18, the prism 22 allows components of the radiation 14 to be detected separately, thereby enabling the detection of additional information regarding the radiation 14 and its discrete components. Moreover, because the radiation 14 is separated by the prism 22 into individual components 16 and 18 that are transmitted in different directions toward separate and spaced detectors, less detectible radiation is lost than would be lost if the radiation 14 had continued toward both filtered detectors without first being separated.

Although components 16 and 18 are directed toward detectors 26 and 28, some radiation in the system may not be separated properly, or may be separated but not reach a detector (depending on the amount of dispersion and location of detectors). Accordingly, filters (e.g., 24 and 25) may still be utilized in order to reject any stray radiation that may be present and which is not within the wavelength range of interest for the detector (e.g., 26 or 28). For example, filter 24 could allow longer wavelength components 16 to pass but to reject any other radiation, such as shorter wavelength radiation 18. Conversely, filter 25 could allow shorter wavelength radiation 18 to pass while rejecting longer wavelength radiation 16. Such filters 24 and 25 can ensure that any radiation 14 which is not separated and any radiation components 16 or 18 which do not reach the proper detector will not interfere with accurate detection.

As discussed earlier, the substrate 30 and light pipe 32 can be utilized to direct the components 16 and 18 toward the correct detectors 26 and 28. As for any radiation 16 and 18 which is not absorbed by the detectors 26 and 28, such as out-of-band radiation reflected from filters 24 and 25 or other non-absorbed radiation that is present, sidewalls 36 can be utilized to redirect this radiation toward the correct detector to thereby reduce the amount of radiation which escapes from the system 20.

Upon detection of one or more longer wavelength components 16, the detector 26 provides a signal through conductor 27 which is proportional to the amount of radiation 16 received by that detector. Likewise, detector 28 provides a signal through conductor 29 which indicates the amount of short wavelength radiation 18 received by that detector. The signals can be provided to electronics and other circuitry which then can indicate the detection of the components 16 and 18 in a suitable manner. For example, if a display is utilized, a first color can be displayed on a location of the display, such as at a pixel location for the display, to indicate the detection of longer wavelength radiation 16 while a second color can be displayed near that same location to indicate the detection of shorter wavelength radiation 18. Thus, the detectors 27 and 29 of the system 20 simultaneously provide multi-wavelength real-time image representations of the scene 12 via the radiation 14 simultaneously as the scene 12 occurs (or with an acceptable amount of delay for processing the signals through the components of the system).

Figure 3:
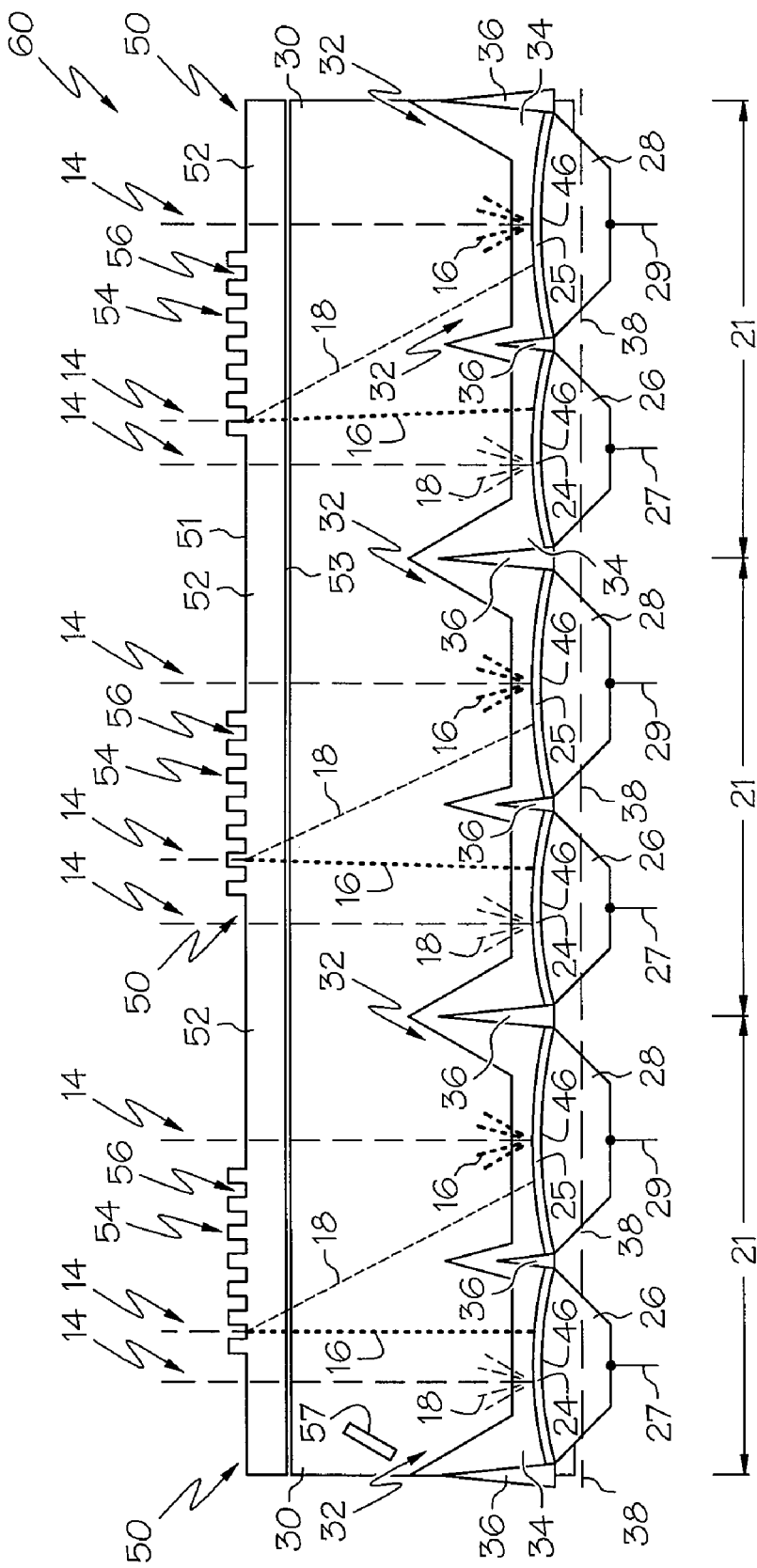
FIG. 3 is a side cross-sectional view of another illustrative embodiment of an optical detection system made and operating according to principles of the present invention.
Figure 4:
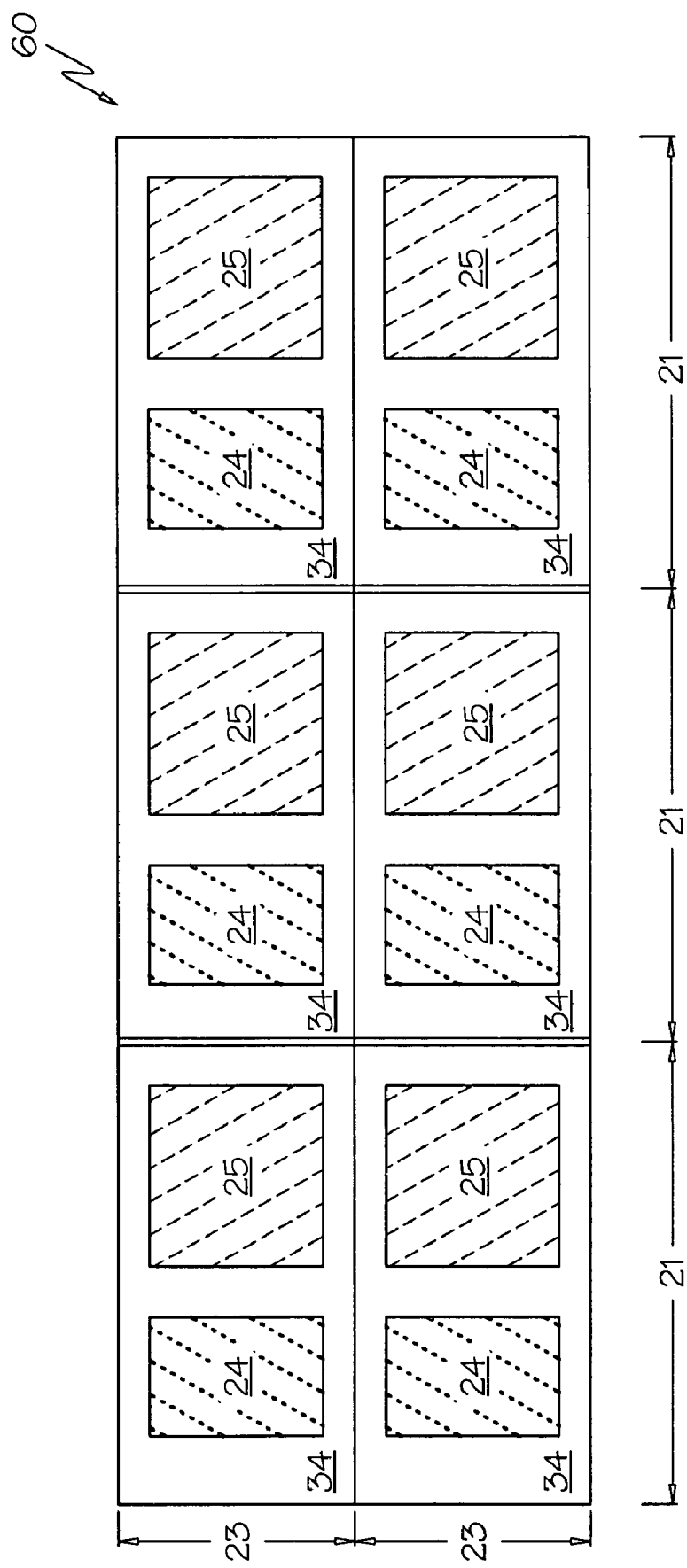
FIG. 4 is a top cross-sectional view taken along the detection layer of the illustrative optical detection system of FIG. 3.

Turning now to other illustrative embodiments, the example of FIGS. 3 and 4 is similar to that of FIGS. 1 and 2, and it should be understood that components having the same reference numerals as the previous example are configured and operate in a similar manner. However, the differences between the two embodiments will be discussed here. Specifically, the system 60 includes a dispersive optic comprising a grating layer 50 made from an optically transmissive material 52 and having an image-facing side 51 and a sensor-facing side 53. The sensor-facing side 53 is placed or formed on top of the substrate 30 so as to deliver radiation thereto. On the opposite side 51, a grated surface 54 is formed or provided. The grated surface 54 can comprise a plurality of uniform or non-uniform grooves, bumps, ridges, or other elevated or recessed areas which interrupt the smooth surface. To manufacture the grated surface 54 and the grating 50, a variety of methods could be utilized including etching, inscription, and silicon immersion grating. Other gratings or spectrometers than the examples shown could also be utilized. As shown by FIG. 3, a grating (or other dispersive optic) can be provided for each pixel and can be positioned near the center ,of the pixel dimensions (e.g., width and/or length), so as to reduce or eliminate the risk that light dispersed via the sides of the grating will stray to other pixels.

To redirect any extraneous or stray radiation that is not absorbed by a detector 26 or 28, additional optics may be placed in the substrate 30. In this example, mirrors 57 are provided and are sized and positioned to direct radiation to the appropriate detector 26 or 28. As can be understood, any of a variety of such optics may be utilized and can be positioned in any of a variety of appropriate locations. In addition, components such as the filters 24 and 25 may be tilted or otherwise positioned, such as to assist in retaining rejected photons.

In operation, the grated surface 54 of the grating layer 50 can provide a very similar effect to that of the prism 22 of FIG. 1. In particular, the grating 50 separates light 14 which enters the surface 54 into a spectrum of radiation including longer wavelength components 16 and shorter wavelength components 18 and directs components of differing wavelengths toward differing locations along the detection plane 38. The detectors 26 and 28 are placed along plane 38 at locations where the radiation 16 and 18 is to be directed by the grating 50. The filter 24 on the detector 26 can prevent wavelengths other than radiation 16 from entering the detector, while the filter 25 can prevent wavelengths other than radiation 18 from entering the detector 28. Accordingly, shorter wavelength radiation 18 may be reflected from filter 24 while longer wavelength radiation 16 may be reflected from filter 25. The mirrors 57 can be used to redirect such reflected radiation back toward the detectors 26 and 28 so that it is not lost and can still be absorbed by its appropriate detector.

In this example, a plurality of pixels are provided in the system 60, each pixel having two detectors 26 and 28. In particular, each pixel has a width 21 that includes a pair of detectors 26 and 28. The detectors 26 and 28 are formed in an image facing plane 38 intended to generally face the image or scene to be detected. Accordingly, the detectors 26 and 28 form a detection layer 46 for facing the scene and receiving radiation therefrom for simultaneously producing real-time images of the scene. Because multiple detectors and pixels are provided in this example, the optical detection system 60 comprises an array of pixels, each pixel being configured to detect a portion of the radiation corresponding to a spatial portion of the scene. Accordingly, the system 60 may comprise a focal plane array or other image detecting array, and the radiation 14 may comprise light in the infrared wavelength band.

The grated surface 54 of the grating 50 includes a plurality of channels or grooves 56 defined by the elevated areas of the grated surface 54 and/or formed in the material 52. A diffraction grating such as grating 50 causes light falling on the grated surface 54 to be dispersed on both sides of the incident beam, the dispersion being inversely proportional to the spacing of the elevated areas. A number of types of gratings may be utilized for such purposes, such as a ruled diffraction grating consisting of a glass substrate carrying a layer of deposited aluminum, a holographic diffraction grating having a sinusoidal groove shape that can be formed by etching the grating at the desired angle with an ion-beam, or other suitable grating devices.

Figure 5:
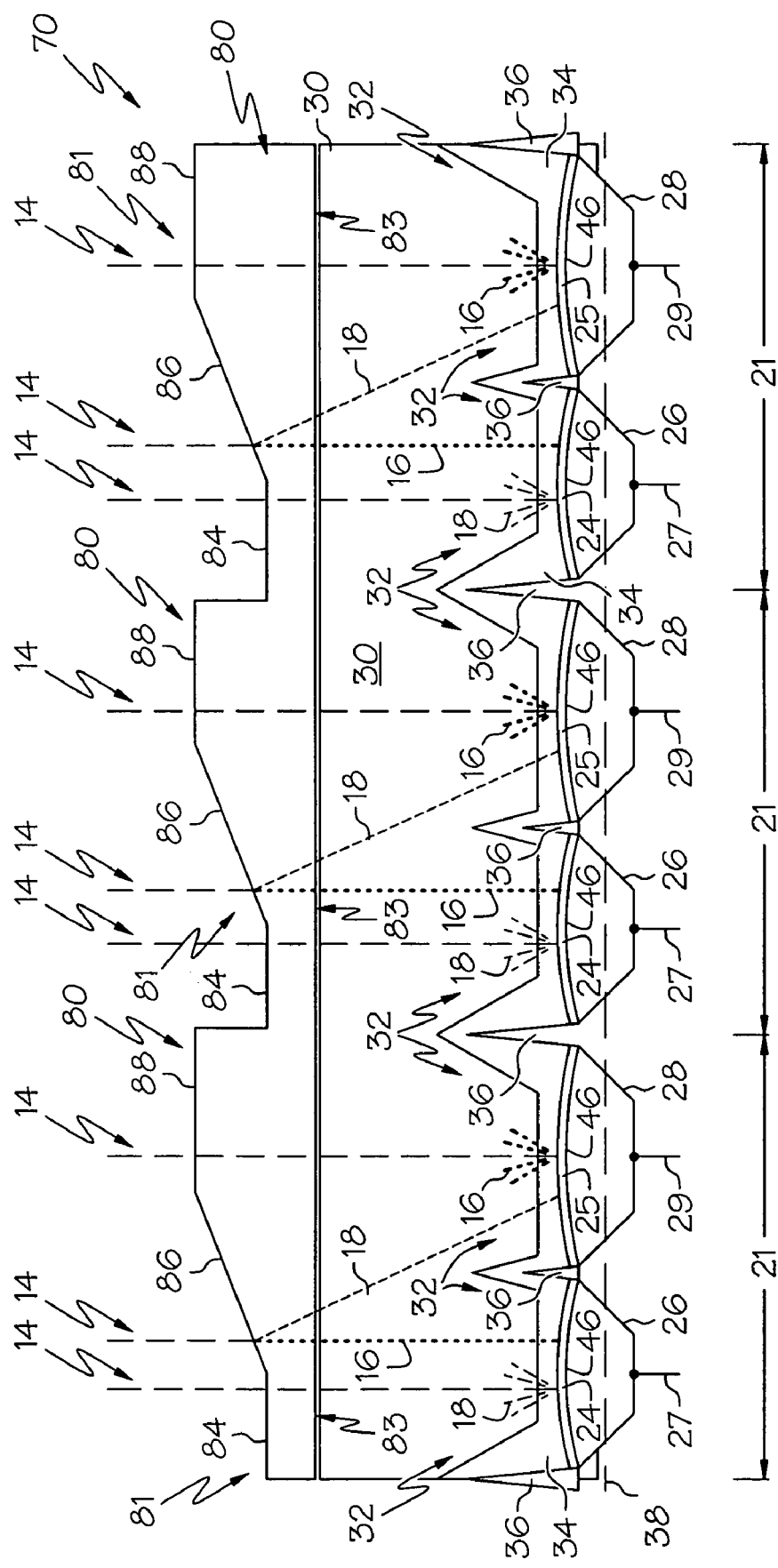
FIG. 5 is a side cross-sectional view of yet another illustrative embodiment of an optical detection system made and operating according to principles of the present invention, the dispersive optic comprising a prism with plateaus at each end.

FIG. 5 and FIG. 6 depict another illustrative embodiment of an optical system comprising a focal plane array 70 which is made up of a number of pixels 72, each pixel having a width 21 and a length 23. Many of the same components of the examples of FIG. 1 and FIG. 3 are included in each pixel 72 of this embodiment, and so the structure and operation of these similar components will not be repeated. However, in this embodiment, a plateau-type prism 80 is provided for dispersion of the radiation 14. One such prism 80 is provided for each pixel, although a single prism may be utilized for the entire system 70 in other embodiments. One side of the prism 80 is intended to face the image and is the image-facing side 81, while the other side is intended to face the sensors and is the sensor-facing side 83. Each prism 80 includes a lower plateau 84 and an upper plateau 88 (e.g., located at the respective ends of a pixel) which are connected by a sloped surface 86 in the middle. For example, the sloped portion of prism 80 can correspond to approximately 50% of the pixel area, while the remaining portion of the prism might be substantially unsloped. Such a configuration can conserve radiation which the prism might have otherwise directed to the sides of detectors 26 and 28 and which therefore may have been lost. The prism 80 can be made from an optically transmissive material such that radiation received on the image-facing side 81 is transmitted to the sensor-facing side 83. Radiation 14 received on the plateau regions 84 and 88 typically transmits directly through the prism material without dispersion into separate components. However, radiation 14 striking the sloped surface 86 typically is dispersed into components 16 and 18 due to the angle at which the radiation strikes the surface 86 and the slope of the surface. Accordingly, the radiation 14 can be separated or split or otherwise dispersed into components 16 having a larger wavelength/lower frequency and components 18 having a smaller wavelength/higher frequency. Other types and numbers of prisms can be provided. For example, multiple prisms can be provided for each pixel. As another example, staircase type prisms can be utilized. For instance, staircase prisms provided by certain microlens structures, and/or staircase prisms where each step size is smaller than the wavelength to be dispersed could be utilized.

The location of the prisms 80, the depth of the material 30 and the spacing of the sensors 26 and 28 are arranged such that the components 16 and 18 which are provided by the sloped surface 86 are directed, focused, or otherwise transmitted toward different locations each having respective detectors 26 and 28. In this example, each detector 26 includes a filter 24 for allowing the passage of large wavelength radiation 16, and each detector 28 includes a filter 25 for allowing the passage of small wavelength radiation 18. Radiation reflected by the filters 24 and 25 can be retransmitted through the substrate 30 and toward the appropriate detector 26 and 28 if desired.

In this example, the size of the detectors 26 and 28 differs, as does the size of the filters 24 and 25 covering the detectors. Such non-uniform sizing of detectors and filters can allow for the adjustment of sensitivity toward one of the wavelength ranges 16 and 18. Such an adjustment may be desired if one of the ranges 16 or 18 is more difficult to detect than the other, if one of the ranges is more important for detection, or if one of the ranges is less prevalent.

FIG. 7, FIG. 8, and FIG. 9 depict yet another illustrative embodiment made and operating in accordance with principles of the present invention. In this example, the detector 90 includes a piezoelectric grating 92 for dispersion of the radiation 14. In addition, this example includes an additional detector 97 which is utilized to detect third radiation components 95, such as a components in a medium wavelength range between that of components 16 and that of components 18. In this example, the grating 92 includes a number of channels 96 formed within a deformable material or membrane 94. Piezoelectric material within the membrane 94 or connected thereto provides a strain force on the material 94 which varies based upon the electrical potential applied, to thereby vary the size of the channels 96. Accordingly, optical parameters of the grating, such as diffraction angle, can be tuned or adjusted as desired to create an appropriate amount of dispersion of the radiation 14 into the components 16, 18, and 95. (Here, the components 16, 95 and 18 are shown as a spaced spectrum of lines of individual wavelengths, although any one of the lines shown herein could itself represent a wavelength range or a spectrum of radiation wavelengths spaced by wavelength size.) Because piezoelectric materials change shape depending upon the amount of voltage applied at the terminals 98 and 99, the material 94 changes shape and, accordingly, the size of the channels or grooves 96 formed in the grating change as well. The material 94 can comprise a fiber material combined with a piezoelectric coating such that the coating and the fiber material are strained through the piezoelectric effect of the voltage applied at the terminals 98 and 99, such as occurs with a piezoelectric fiber BRAGG grating (PFBG). Other types of tunable piezoelectric gratings may be utilized as alternatives to that shown in FIG. 7, such as "micro electro mechanical systems" (MEMS) gratings or other electrically tunable grating devices and materials.

In the example of FIGS. 7-9, the detectors 26, 28, and 97 do not include a filter layer, because such filters may not be necessary in all implementations if suitable dispersion of the radiation 14 can be achieved without too wide or too narrow dispersion of radiation components. Accordingly, as can be understood, a variety of modifications can be made to the embodiments disclosed herein. For example, the detectors 26, 28 and 97 could each comprise a separate type of detector depending on the type of radiation to be detected and the use contemplated. Specifically, detector 26 could comprise a silicon detector, detector 97 could comprise an InSb detector, and detector 28 could comprise an MCT detector. Selection of the type and number of detectors can depend on the number and wavelength range of the dispersed radiation components to be detected. Similarly, as shown by the drawings, the placement of the dispersive optic can be varied for improved performance. For example, as shown in FIG. 3, the optic may be placed near the center of the pixel. Likewise, as shown by the above description, the dispersive optic can comprise a number of components, such as, for example, prisms or gratings or other non-lens components which do not converge or diverge the light received.

Accordingly, the foregoing descriptions of the various embodiments have been presented for purposes of illustration and description only. They are not intended to be exhaustive or to limit the invention to the precise forms disclosed, and modifications and variations are possible and contemplated in light of the above teachings. While a number of alternate embodiments, methods, systems, components, configurations, and potential uses have been described, it should be understood that many other variations and alternatives could be utilized without departing from the principles of the invention. For example, while certain detector and optical components are shown as being separate and others as being integral, such components may be integrated, separated, or eliminated as desired or appropriate. Likewise, while certain arrangements and spacings of components are shown, other arrangements and spacings may be utilized. Accordingly, it is intended that the scope of the invention be defined by the claims appended hereto.

What is claimed is:

1. A focal plane array for providing real-time images of scenes, comprising:
   a plurality of detectors provided along a two-dimensional image facing plane of the array, wherein each detector is provided at a pixel location and is configured to detect the presence of light, wherein each detector has a width less than that of its corresponding pixel, wherein at least two detectors are located within a single pixel location, wherein the size of each pixel location is approximately equal to the blur spot for the focal plane array, wherein the blur spot comprises the smallest visible spot provided by the array; and
   a plurality of light pipe regions, wherein each light pipe region is associated with each detector and configured to direct the light toward the detector and away from regions where light is not detected, wherein each light pipe region has a width of less than that of a pixel location, wherein at least two light pipe regions are located within a single pixel location.

2. The system as recited in claim 1, further comprising:
   sidewalls configured near the sides of each light pipe region and configured to direct light into the detectors.

3. The system as recited in claim 2, wherein the light pipe region comprises a generally V shaped region of a silicon substrate, the light pipe and sidewalls having different indices of refraction.

4. The system as recited in claim 1, wherein each light pipe region is located above the detector for a pixel location, and further comprising a sidewall positioned adjacent each light pipe region.

5. A method for providing images from light from a scene, the method comprising:
   receiving light having multiple wavelength components from a scene;
   transmitting the wavelength components through a plurality of tapered micro-optical light guide regions toward a plurality of micro-optical detectors within a single pixel, wherein each tapered micro-optical light guide region has a width substantially less than that of the single pixel, wherein more than one light guide region and more than one detector is located within the single pixel, and wherein the light guide is tapered so as to have a larger width at its exterior than at its interior; and
   detecting the wavelength components at the pixel using the micro-optical detectors located within the pixel, wherein the micro-optical detectors have a width substantially less than that of the pixel.

* * * * *

UNITED STATES PATENT AND TRADEMARK OFFICE
CERTIFICATE OF CORRECTION

PATENT NO. : 7,351,977 B2 Page 1 of 1
APPLICATION NO. : 10/702702
DATED : April 1, 2008
INVENTOR(S) : John W. Devitt et al.

It is certified that error appears in the above-identified patent and that said Letters Patent is hereby corrected as shown below:

On the title page item (57),

In the first sentence of the Abstract, insert --radiation.-- at the end of the sentence which reads "Methods and systems for detection of"

Signed and Sealed this

Eighteenth Day of November, 2008

JON W. DUDAS
*Director of the United States Patent and Trademark Office*